United States Patent

Arcari et al.

[11] 3,904,634
[45] Sept. 9, 1975

[54] BROMOERGOLINES AND PROCESS FOR PREPARING THE SAME

[75] Inventors: Giuliana Arcari; Luigi Bernardi; Alfredo Glasser; Bianca Patelli, all of Milan, Italy

[73] Assignee: Farmitalia Societa Farmaceutici Italia, Milan, Italy

[22] Filed: June 21, 1973

[21] Appl. No.: 372,320

[30] Foreign Application Priority Data
June 22, 1972 Italy................................. 26024/72

[52] U.S. Cl............................... 260/285.5; 424/261
[51] Int. Cl................ C07d 457/02; C07d 457/04; C07d 457/06
[58] Field of Search................................. 260/285.5

[56] References Cited
UNITED STATES PATENTS

| | | | |
|---|---|---|---|
| 3,185,695 | 5/1965 | Bernardi et al. | 260/285.5 |
| 3,218,324 | 11/1965 | Hofmann et al. | 260/285.5 |
| 3,228,943 | 1/1966 | Bernardi et al. | 260/285.5 |
| 3,232,942 | 2/1966 | Hofmann et al. | 260/285.5 |
| 3,236,852 | 2/1966 | Bernardi et al. | 260/285.5 |

*Primary Examiner*—G. Thomas Todd
*Attorney, Agent, or Firm*—Hubbell, Cohen & Stiefel

[57] ABSTRACT

Novel bromoergoline derivatives having high adrenolytic activity, and a method for their preparation. These ergoline derivatives are of the following structural formula:

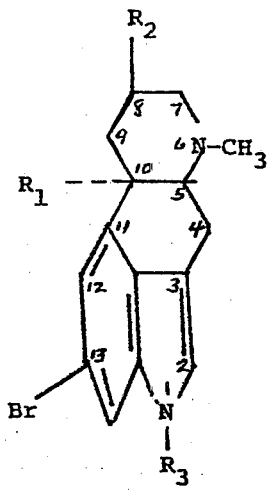

wherein $R_1$ is hydrogen or methoxy;
$R_2$ is —$CONH_2$; —$CH_2X$ wherein X is —$NH_2$, —OH, or

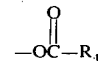

wherein $R_4$ is aryl, substituted aryl, heterocycl, or substituted heterocycl; or

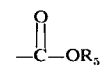

wherein $R_5$ is $R_3$ is hydrogen or methyl.

15 Claims, No Drawings

BROMOERGOLINES AND PROCESS FOR PREPARING THE SAME

BACKGROUND OF THE INVENTION

The present invention is directed to a new class of bromoergoline derivatives which are useful in therapy, and to a process for their preparation.

SUMMARY OF THE INVENTION

The present invention is directed to new compounds having the following structural formula:

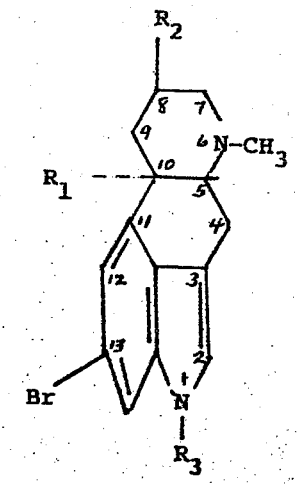

wherein $R_1$ is hydrogen or methoxy;
$R_2$ is —$CONH_2$; —$CH_2X$ wherein X is —$NH_2$, —OH, or

wherein $R_4$ is aryl, substituted aryl, heterocycyl, or substituted heterocycyl; or

wherein $R_5$ is hydrogen or lower alkyl; and $R_3$ is hydrogen or methyl;
and further is directed to a method of preparing the foregoing compounds.

The compounds of the present invention exhibit a high adrenolytic activity.

DESCRIPTION OF THE PREFERRED EMBODIMENTS

The compounds of the present invention are prepared according to the following reaction scheme:

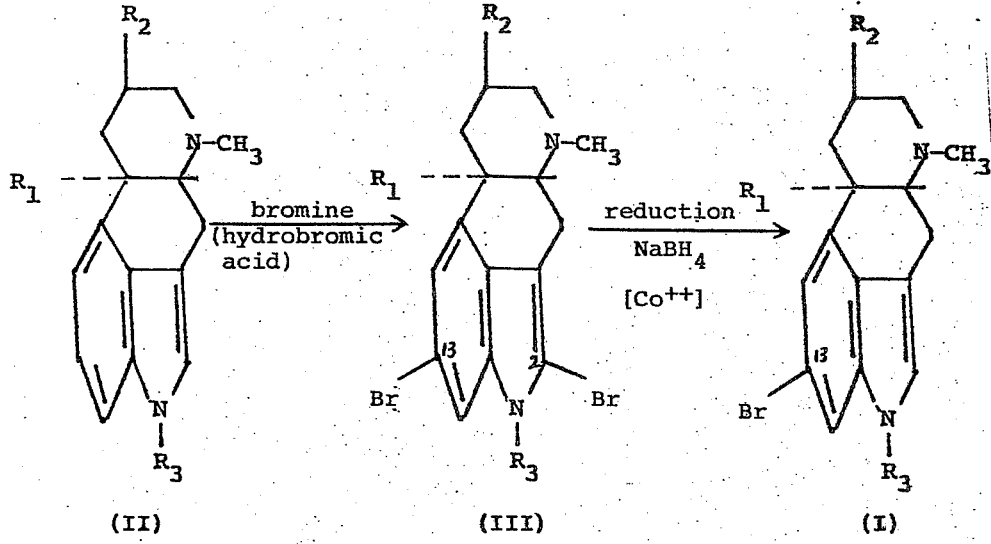

wherein $R_1$, $R_2$ and $R_3$ are as defined above.

More particularly, a derivative of formula II is brominated, optionally in the presence of hydrobromic acid, to give a 2,13-dibromoderivative of formula III. By reaction with sodiumborohydride, in the presence of a cobaltous salt, such as, for example, cobaltous chloride ($CoCl_2$), at a temperature between about $-30°$ and $+30°C$, there occurs selective removal of the bromine atom from the 2-position to thereby transform the product into the corresponding 13-bromoderivative of formula I.

The selectivity and the linearity of the reaction are believed to be unique.

The foregoing ergoline derivatives, substituted in the 13-position by a bromine atom, show a markedly higher adrenolytic activity and a much lower toxicity than the non-substituted compounds. By contrast, bromine substitution in the 2-position, or dibromine substitution in the 2- and 13-positions, results in a reduction of the adrenolytic and anti-enteraminic activity.

The adrenolytic activity of the compounds of the present invention was studied "in vitro" and "in vivo" and was compared with that for the corresponding other derivatives referred to above.

Thus, the activity of 1,6-dimethyl-8β(5'-bromonicotinoyloxy-methyl)-13-bromo-10α-methoxyergoline (A), was compared with that of the non-brominated derivative (B), arbitrarily indicated as having an activity equal to 100, with that of the 2-bromoderivative (C), and with that of the 2,13-dibromoderivative (D).

The results, reported in the table below, show the marked increase in adrenolytic activity for the compound monosubstituted in the 13-position.

In the "in vitro" studies, it has been shown that the adrenolytic effect of derivative (A) is markedly superior to that of derivative (B). Thus, the seminal small bladder tissue to which derivative (B) was added requires only two washings with physiological solution to completely remove the adrenolytic effect of derivative (B) from said tissue. On the other hand, the same tissue having derivative (A) added thereto requires ten washings with physiological solution to completely remove the adrenolytic effect of derivative (A).

TABLE

| Compound | Ref. | m.p. | Adrenolytic activity "in vitro" (seminal small bladder in guinea-pig) | Adrenolytic activity "in vivo" (protection from death by adrenaline) |
|---|---|---|---|---|
| 1,6-dimethyl-8-$\beta$-(5'-bromonicotinoyloxymethyl)-10-$\alpha$-methoxyergoline | B | 138–139° | 100 | 100 |
| 1,6-dimethyl-2-bromo-8-$\beta$-(5'-bromonicotinoyloxymethyl)-10-$\alpha$-methoxyergoline | C | 143–145° | 10 | 35 |
| 1,6-dimethyl-2,13-dibromo-8-$\beta$-(5'-bromonicotinoyloxymethyl)-10-$\alpha$-methoxyergoline | D | 188–190° | 5 | 70 |
| 1,6-dimethyl-8-$\beta$-(5'-bromonicotinoyloxymethyl)-13-bromo-10-$\alpha$-methoxyergoline | A | 178–180° | 120 | 200 |

The following examples will further illustrate the invention. Unless otherwise indicated, all parts given are by weight.

EXAMPLE 1

To 3 g of methyl 10 $\alpha$-methyoxydihydrolysergate (formula II; $R_1 = CH_3O-$; $R_2 = COOCH_3$; $R_3 = H$) dissolved in 60 ml of acetic acid there was added, with shaking, 1 gram mole of bromine. After 10 minutes, 1 ml of pyridine was added and the whole was concentrated under vacuum. The solvent was evaporated off and the residue was crystallized, first from benzene and subsequently from methanol. 2.9 g of methyl 2-bromo-10$\alpha$-methoxydihydrolysergate, m.p. 210°–212°C, were obtained, which were dissolved in 50 ml of acetic acid, and 1 mole of bromine was added thereto. After 10 minutes, 1 ml of pyridine was added and the whole was evaporated under vacuum. The residue was made alkaline by the addition of aqueous ammonia and extracted with chloroform. The chloroform was removed under vacuum and the residue was chromatographed on silica gel. By eluting the silica gel with chloroform, 3.9 g of methyl 2,13-dibromo-10 $\alpha$-methoxydihydrolysergate, m.p. 230°–232°C, were obtained.

1.5 g of this compound were dissolved in 90 ml of methanol and there were added at −20°C, 3.7 g of cobaltous chloride and then 3 g of sodium borohydride. After 30 minutes at −20°C, the product was diluted with water and extracted with ethyl acetate. The solvent was evaporated under vacuum and the residue was crystallized from acetone. Methyl 13-bromo-10$\alpha$-methoxydihydrolysergate was obtained, m.p. 163°–165°C. Yield (Y) = 75%.

EXAMPLE 2

Operating as described in Example 1, however starting with 1-methyl 10$\alpha$-methoxydihydrolysergol (formula II; $R_1=CH_3O-$; $R_2= -CH_2OH$; $R_3= -CH_3$) there was obtained 1-methyl-2,13-dibromo-10$\alpha$-methoxydihydrolysergol, m.p. 203°–205°C (Y= 70%).

1 g of 1-methyl-10$\alpha$-methoxy-2,13-dibromodihydrolysergol was dissolved in 60 ml of methanol, to which were added, at −20°C, 2.5 g of cobaltous chloride and thereafter 2 g of sodium borohydride.

After 30 minutes at −20°C, the whole was diluted in water and extracted with ethyl acetate. The solvent was evaporated off under vacuum and the residue was crystallized from acetone. 0.6 g of 1-methyl-10$\alpha$-methoxy-13-bromodihydrolysergol was obtained, m.p. 196°–198°C.

EXAMPLE 3

Operating as in Example 1, however using as the starting compound dihydrolysergol (formula II; $R_1=H$; $R_2= -CH_2OH$; $R_3=H$), there was obtained 13-bromodihydrolysergol, m.p. 248°–250°C (Y = 80%).

EXAMPLE 4

Operating as in Example 1, however starting with 1-methyldihydrolysergol (formula II; $R_1=H$; $R_2= -CH_2OH$; $R_3= -CH_3$), there was obtained 1-methyl-13-bromodihydrolysergol, m.p. 203°–205°C.

EXAMPLE 5

Operating as in Example 1, however starting with dihydrolysergamide (formula II; $R_1=H$; $R_2= -CONH_2$; $R_3=H$), there was obtained 13-bromodihydrolysergamide, m.p. 208°–210°C (Y= 70%).

EXAMPLE 6

Operating as in Example 1, however starting with 1-methyldihydrolysergamine (formula II; $R_1=H$; $R_2= -CH_2NH_2$; $R_3= -CH_3$), there was obtained 1-methyl-13-bromodihydrolysergamine, m.p. 78°–80°C (Y = 60%).

EXAMPLE 7

Operating as in Example 1, however starting with methyl dihydrolysergate (formula II; $R_1=H$; $R_2= -COOCH_3$; $R_3= -H_3$), there was obtained methyl 2,13-dibromodihydrolysergate, m.p. 259°–260°C (Y = 72%). To 1.5 g of this compound dissolved in 30 ml of methanol and 10 ml of dioxane there were added, at 0°C, 3.6 g of cobaltous chloride and then 3 g of sodium borohydride.

After 30 minutes at 0°C, the whole was diluted with water and taken up with ethyl acetate. The ethyl acetate extract was washed with water and then evaporated under vacuum. The residue was crystallized from acetone/petroleum ether and 0.95 g of methyl 13-bromodihydrolysergate was obtained, m.p. 190°–192°C.

EXAMPLE 8

Operating as in Example 1, however starting with dihydrolysergic acid (formula II; $R_1$=H; $R_2$= —COOH; $R_3$=H), there was obtained 2,13-dibromodihydrolysergic acid, m.p. 300°C (Y = 72%). By reaction of this compound with sodium borohydride and cobaltous chloride, 13-bromodihydrolysergic acid was obtained.

EXAMPLE 9

0.5 g of 1-methyl-10α-methoxy-13-bromodihydrolysergol (formula I; $R_1$=CH$_3$O—; $R_2$= —CH$_2$OH; $R_3$= —CH$_3$) was dissolved in 6 ml of pyridine and 0.5 g of pyrrol-2-carboxylic acid chloride was added thereto. After one night at room temperature, the compound was evaporated under vacuum, taken up with aqueous ammonia, and extracted with ethyl acetate. The solvent was evaporated off and the residue was chromatographed on silica gel.

0.4 g of 1-methyl-10α-methoxy-13-bromodihydrolysergol-2-pyrrolcarboxylate were obtained, m.p. 233°–235°C.

EXAMPLE 10

Operating as in Example 9, however employing 5-bromonicotinoyl chloride rather than pyrrol-2-carboxylic acid chloride, there was obtained 1-methyl-10α-methoxy-13-bromodihydrolysergol 5-bromonicotinate [i.e., 1,6-dimethyl-8α(5′-bromonicotinoyloxymethyl)-13-bromo-10α-methoxyergoline], m.p. 178°–180°C (Y = 90%).

EXAMPLE 11

Operating as in Example 10, using 1-methyl-13-bromodihydrolysergol (formula I; $R_1$=H; $R_2$= —CH$_2$OH; $R_3$= —CH$_3$), there was obtained 1-methyl-13-bromodihydrolysergol 5-bromonicotinate, m.p. 175°–177°C (Y = 86%).

EXAMPLE 12

To 0.6 g of 1-methyl-13-bromodihydrolysergamine (formula I; $R_1$=H; $R_2$= —CH$_2$NH$_2$; $R_3$= —CH$_3$) dissolved in 5 ml of pyridine was added 0.4 g of benzoyloxycarbonylchloride at 0°C. After one night at room temperature, the product was evaporated under vacuum, taken up with water, made alkaline with aqueous ammonia, and extracted with ethyl acetate.

The solvent was evaporated off and the residue was chromatographed on silica gel. 0.4 g of 1-methyl-13-bromocarbobenzoxydihydrolysergamine (amorphous) was obtained, which, upon treatment with maleic acid quaternized the 6-nitrogen atom yielding a crystal-line acid maleate salt melting at 98°–100°C.

Variations can, of course, be made without departing from the spirit and scope of the invention.

Having thus described our invention, what is desired to be secured by Letters Patent and hereby claimed is:

1. A method of making a compound of the following structural formula:

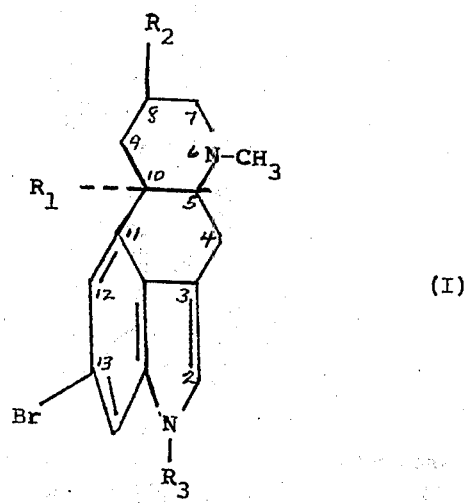

wherein $R_1$ is hydrogen or methoxy;

$R_2$ is —CONH$_2$; —CH$_2$X wherein X is —NH$_2$, —OH, or

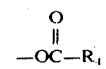

where $R_4$ is phenyl, pyrrolyl or 5-bromopyridyl; or

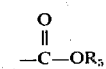

wherein $R_5$ is hydrogen or lower alkyl; and $R_3$ is hydrogen or methyl;

this method comprising brominating a compound of the formula:

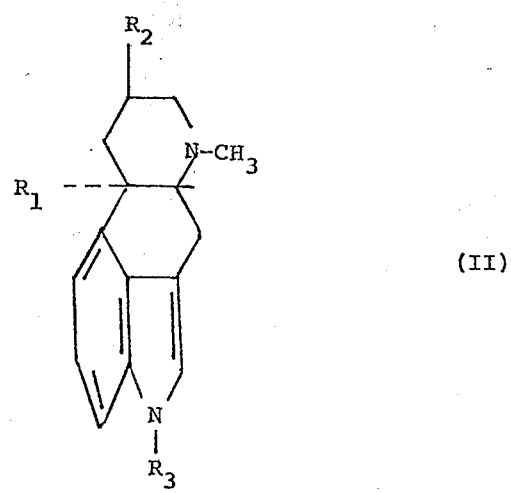

wherein R₁, R₂ and R₃ are as defined above, to yield a compound of formula

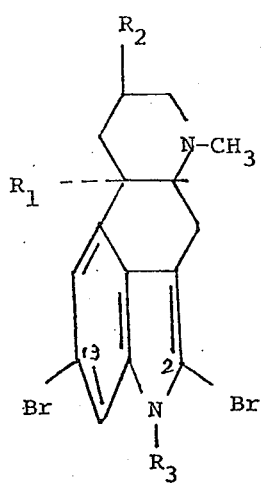

(III)

wherein R₁, R₂ and R₃ are as defined above, and reacting said compound (III) with sodiumborohydride, in the presence of a cobaltous salt, at a temperature between about −30°C and +30°C, to thereby selectively remove a bromine atom from the 2-position and thereby yield a 13-bromo derivative of formula (I).

2. The method of claim 1 wherein said bromination of the compound of formula (II) is carried out in the presence of hydrobromic acid.

3. A compound of the formula:

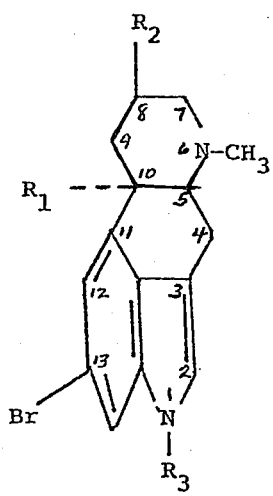

wherein R₁ is hydrogen or methoxy;
R₂ is —CONH₂; —CH₂X wherein X is —NH₂, —OH, or

wherein R₄ is phenyl, pyrrolyl or 5-bromopyridyl; or

wherein R₅ is hydrogen or lower alkyl; and
R₃ is hydrogen or methyl.

4. A compound as defined in claim 3 which is methyl 13-bromodihydrolysergate.

5. A compound as defined in claim 3 which is 1-methyl-10α-methoxy-13-bromo-dihydrolysergol.

6. A compound as defined in claim 3 which is 13-bromodihydrolysergamide.

7. A compound as defined in claim 3 which is 13-bromodihydrolysergol.

8. A compound as defined in claim 3 which is 1-methyl-13-bromo-dihydrolysergol.

9. A compound as defined in claim 3 which is 1-methyl-13-bromo-10α-methoxy-dihydrolysergate.

10. A compound as defined in claim 3 which is 1-methyl-13-bromo-dihydrolysergamine.

11. A compound as defined in claim 3 which is 13-bromodihydrolysergic acid.

12. A compound as defined in claim 3 which is 1-methyl-10α-methoxy-13-bromo-dihydrolysergol 2-pyrrolcarboxylate.

13. A compound as defined in claim 3 which is 1,6-dimethyl-8β-(5′-bromonicotinoyl-oxymethyl)-13-bromo-10α-methoxy-ergoline.

14. A compound as defined in claim 3 which is 1-methyl-13-bromo-dihydrolysergol 5-bromonicotinate.

15. A compound as defined in claim 3 which is 1-methyl-13-bromo-carbobenzoxydihydrolysergamine.

* * * * *

PO-1050
(5/69)

UNITED STATES PATENT OFFICE
CERTIFICATE OF CORRECTION

Patent No. 3,904,634  Dated September 9, 1975

Inventor(s) GIULIANA ARCARI et al  Page - 2

It is certified that error appears in the above-identified patent and that said Letters Patent are hereby corrected as shown below:

Column 6, line 35: "where" should read -- wherein --.

Signed and Sealed this thirteenth Day of January 1976

[SEAL]

Attest:

RUTH C. MASON
*Attesting Officer*

C. MARSHALL DANN
*Commissioner of Patents and Trademarks*

Notice of Adverse Decision in Interference

In Interference No. 99,385, involving Patent No. 3,904,634, G. Arcari, L. Bernardi, A. Glasser and B. Patelli, BROMOERGOLINES AND PROCESS FOR PREPARING THE SAME, final judgment adverse to the patentees was rendered June 14, 1977, as to claims 3, 4 and 11.

[*Official Gazette September 20, 1977.*]